United States Patent [19]

Lu

[11] Patent Number: 5,894,635
[45] Date of Patent: Apr. 20, 1999

[54] HINGE DEVICE

[76] Inventor: Sheng-Nan Lu, No. 174, Chunying St., Shulin Chen, Taipei Hsien, Taiwan

[21] Appl. No.: 09/030,904

[22] Filed: Feb. 26, 1998

[51] Int. Cl.⁶ .............................. E05C 17/64; E05D 5/10
[52] U.S. Cl. ............................. 16/342; 16/386; 403/297
[58] Field of Search .................... 16/342, 341, 337, 16/386, 336, 262, 268; 403/297, 300

[56] References Cited

U.S. PATENT DOCUMENTS

| 763,256 | 6/1904 | Burtis | 16/386 |
|---|---|---|---|
| 1,193,636 | 8/1916 | Van Antwerp | 16/339 |
| 2,398,573 | 4/1946 | Becker | 16/386 |
| 5,333,356 | 8/1994 | Katagiri | 16/342 |
| 5,503,491 | 4/1996 | Lu | 16/342 |

*Primary Examiner*—Chuck Y. Mah
*Attorney, Agent, or Firm*—Rosenberg, Klein & Bilker

[57] ABSTRACT

A hinge device has a hollow first portion and a second portion rotatably received within the hollow first portion is able to provide sufficient torque to a notebook computer or the like, no matter whether the hollow first portion or the second portion is pivotally connected with a monitor.

3 Claims, 3 Drawing Sheets

HINGE DEVICE

FIELD OF THE INVENTION

The present invention generally relates to a hinge device, and more particularly to a hinge device pivotally and respectively connected with a monitor and a mother board of a notebook computer.

BACKGROUND OF THE INVENTION

Hinge devices have been used as a connecting media between a monitor and a mother board of a notebook computer for a long time. Most hinge devices do have sufficient effect to provide necessary torque between the monitor and the mother board when the notebook computer is opened to display the monitor. However, one strength/size of hinge might be manufactured to cope with monitors of different weights and so the hinge is manufactured to cope with the heavier monitor. Therefore, some hinge devices which are mounted within the present notebook computers seem to involve a waste in material. An idea of using the right tool to complete a task is becoming more and more important these days. Therefore, to provide a suitable hinge device for light load is crucial in the modern efficiency-concious.

Thus, a hinge device constructed in accordance with the present invention tends to mitigate and/or obviate the aforementioned problems.

SUMMARY OF THE INVENTION

The main objective of the invention is to provide a hinge device which is simple in structure, easy to be manufactured and efficient in performance.

In accordance with one aspect of the invention, the hinge device comprises a hollow first portion having a first connecting stem integrally formed therewith and a second portion partially and rotatably received within the first portion. The second portion has a second connecting stem integrally extending out therefrom and an inserted part extending opposite to the connecting stem. The inserted part has an axially defined channel and two pairs of mutually corresponding arcuate portions. By the insertion of the inserted part into the hollow first portion and the connection of the two pairs of mutually corresponding arcuate portions with an inner periphery of the hollow first portion, a sufficient torque is thus obtained to provide for the need of a notebook computer.

Other objects, advantages and novel features of the invention will become more apparent from the following detailed description when taken in conjunction with the accompanying tools.

BRIEF DESCRIPTION OF THE DRAWINGS

The present invention will now be better understood with reference to the following tools, wherein.

DETAILED DESCRIPTION OF THE PREFERRED EMBODIMENT

Figure 1:
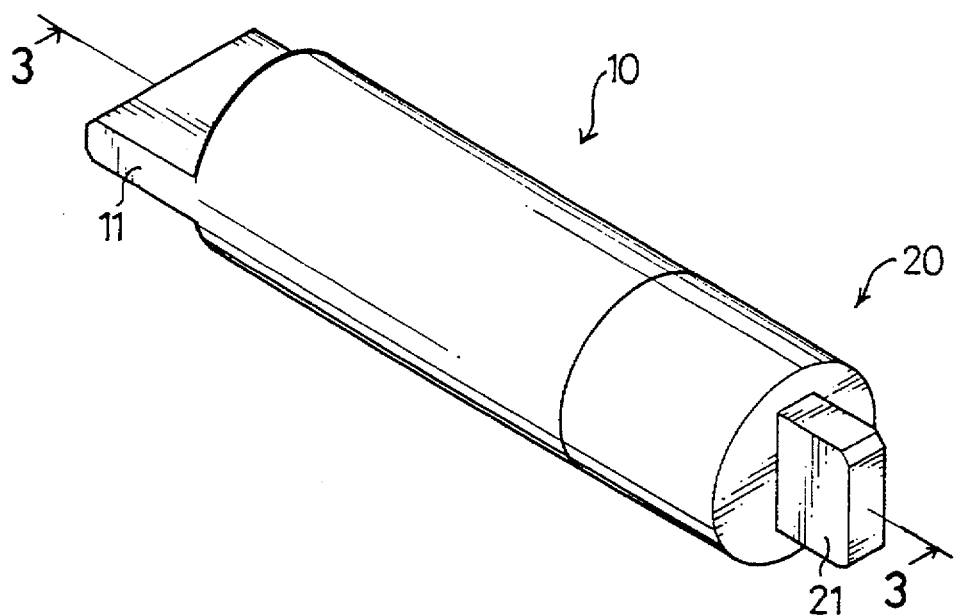
FIG. 1 is a perspective view of a preferred embodiment of a hinge device constructed in accordance with the present invention.
Figure 3:
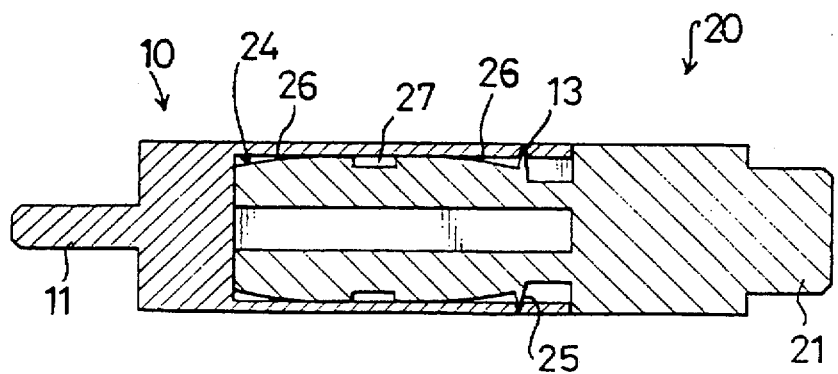
FIG. 3 is a sectional view of FIG. 1 taken along line 3—3.
Figure 2:
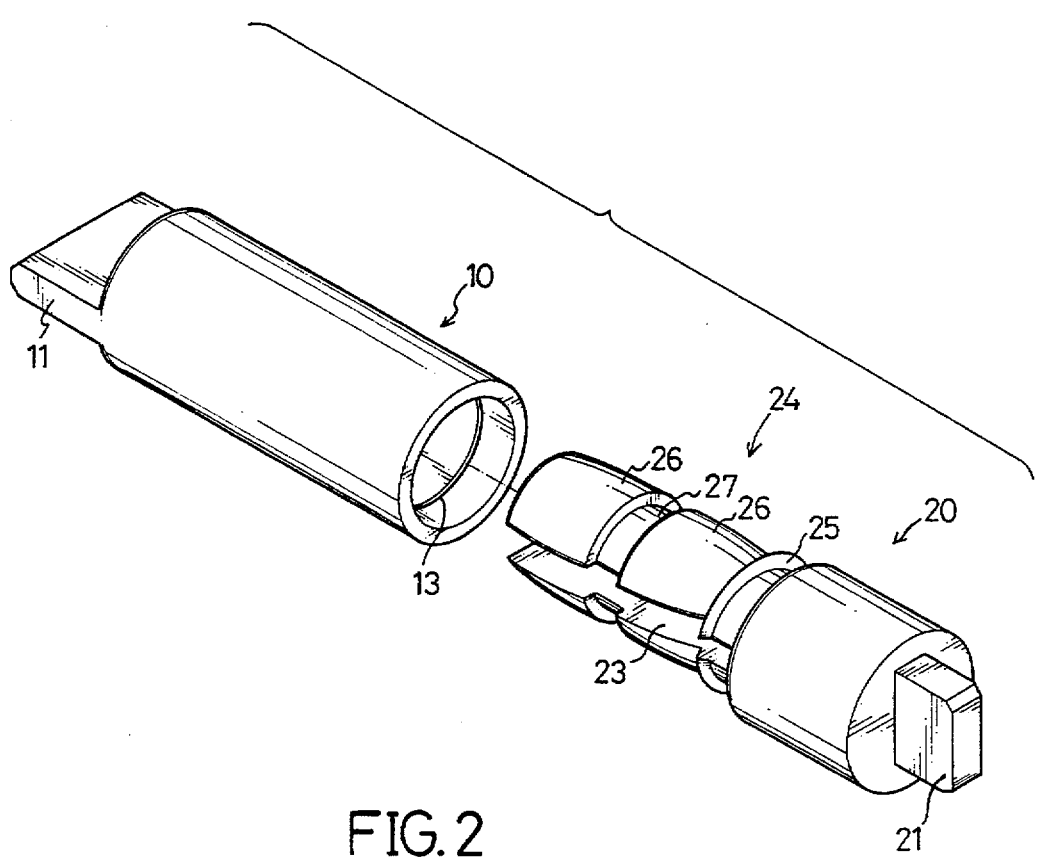
FIG. 2 is an exploded view showing the hinge device as shown in FIG. 1.

Referring to FIGS. 1, 2 and 3, a hinge device comprises a hollow first portion 10 having a first connecting stem 11 integrally extending out therefrom and a groove 13 defined in an inner periphery thereof and a second portion 20 partially and rotatably received within the hollow first portion 10. The second portion 20 has a second connecting stem 21 integrally extending out therefrom and an inserted part 24 extending opposite to the connecting stem 21. The inserted part 24 has an axially defined channel 23 and two pairs of diametrically corresponding arcuate portions 26. By the insertion of the inserted part 24 into the hollow first portion 10 and the connection of the two pairs of mutually corresponding arcuate portions 26 with an inner periphery of the hollow first portion 10, a sufficient torque is thus obtained to provide for the need of a notebook computer.

An annular depression 27 in communication with the channel 23 is defined between the two pairs of arcuate portions 26. A flange 25 corresponding to the groove 13 of the hollow first portion 10 is formed on the inserted part 24 of the second portion 20. The annular depression 27 and the flange 25 respectively further enhance the rotation between the hollow first portion 10 and the inserted portion 24 and to strengthen the positioning of the inserted portion 24 within the hollow first portion 10. Thus, prior to the assembly of the hinge assembly, a lubricant is able to be added to the annular depression 27 to smooth the rotation between the inner periphery of the hollow first portion 10 and the periphery of the inserted part 24. It is to be noted that to achieve an interference fit between the periphery of the two pairs of arcuate portions 26 and the inner periphery of the hollow first portion 10, a major part of the circumferential periphery of inserted part 24 is slightly greater than the diameter of the inner periphery of the hollow first portion 10.

Figure 4:
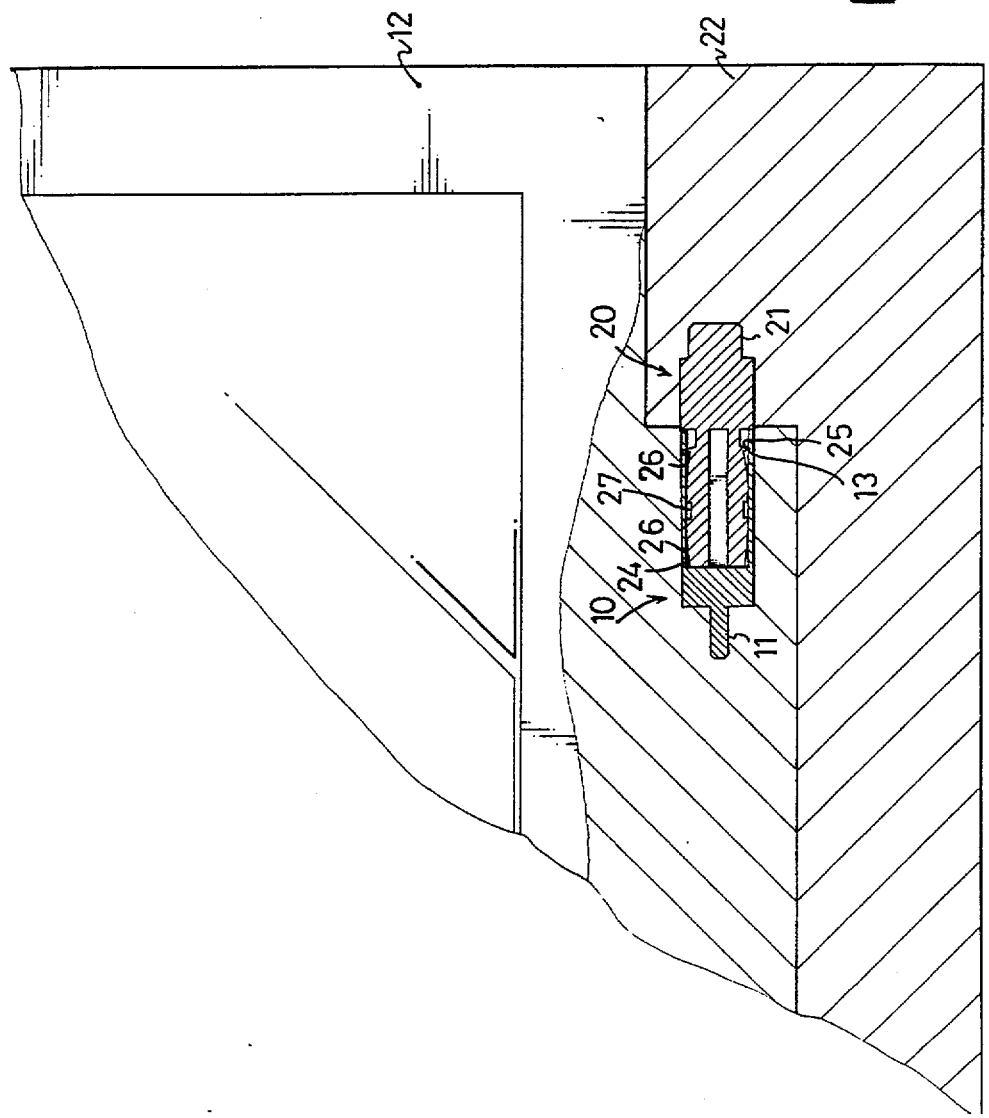
FIG. 4 is a schematic front view showing the relationship among the hinge device, a monitor and a mother board when the hinge device is mounted within a notebook computer.

Referring to FIG. 4, no matter whether the hollow first portion 10 or the second portion 20 is pivotally connected to a monitor 12 respectively through the first connecting stem 11 or the second connecting stem 21 (the first connecting stem 11 is connected to the monitor 12 in this embodiment), the other portion will then be pivotally connected to a mother board 22. Therefore, with the interference fit between the inner periphery of the first portion 10 and the circumferential periphery of the inserted part 24, a sufficient torque is created to hold the monitor 12 in position.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying tools shall be interpreted as illustrative and not in a limiting sense.

What is claimed is:

1. A hinge device comprising:

a hollow first portion having a first connecting stem integrally extending out therefrom;

a second portion having a second connecting stem extending therefrom and having an inserted part rotatably received within said hollow first portion, said inserted part provided with two pairs of diametrically corresponding arcuate portions, a channel axially defined therein and an annular depression defined between said two pairs of arcuate portions and in communication with said channel.

2. The hinge device as claimed in claim 1, wherein said hollow first portion further has a groove defined in an inner periphery thereof and said inserted part of said second portion further has a flange rotatably received within said groove.

3. The hinge device as claimed in claim 1, wherein a major part of the circumferential periphery of said inserted part is formed slightly greater than a diameter of the inner periphery of said hollow first portion, thereby to achieve an interference fit between the periphery of the two pairs of arcuate portions and the inner periphery of the hollow first portion.

* * * * *